Figure 1:
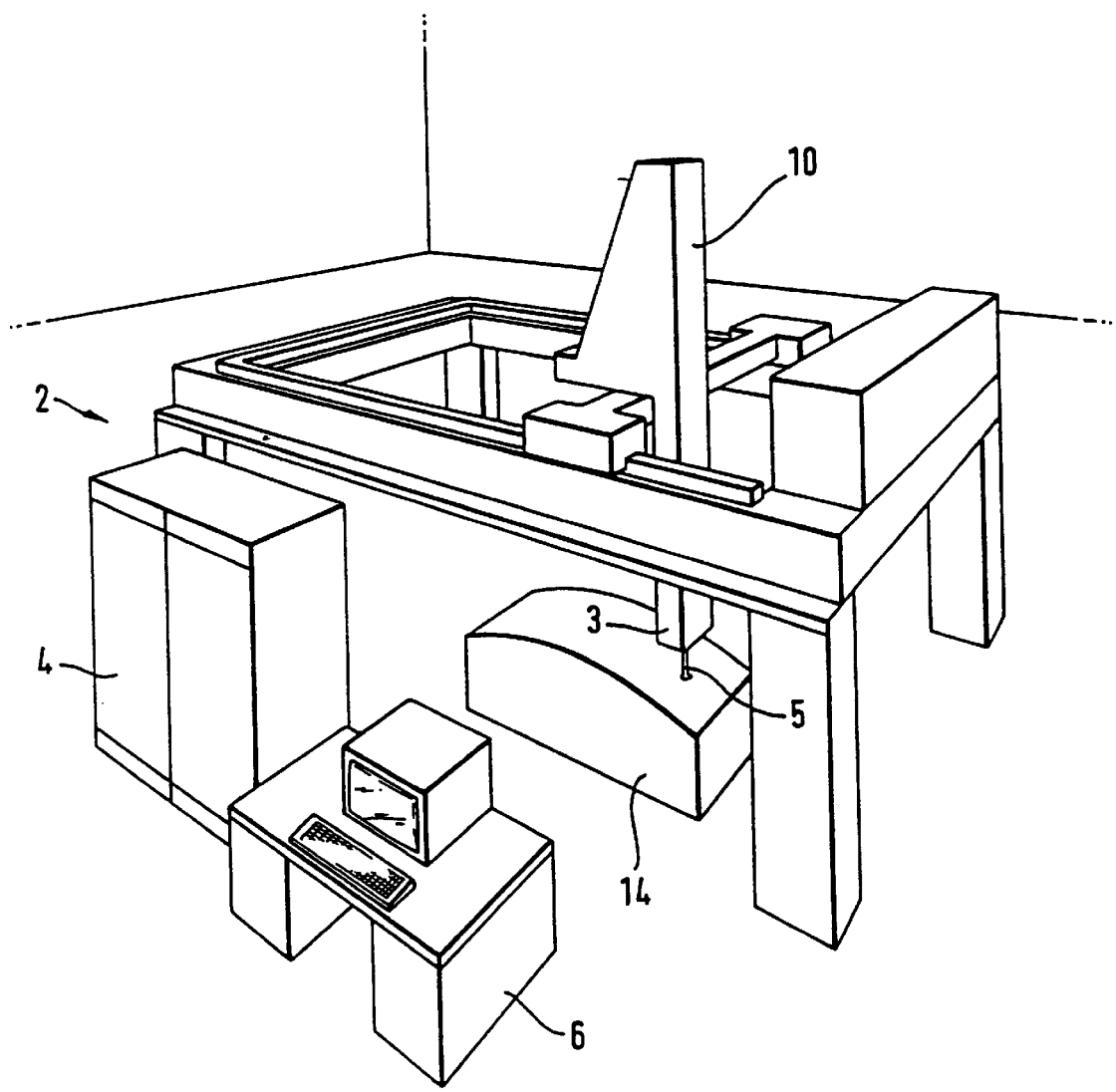

United States Patent

Bestenlehrer

[11] Patent Number: 6,043,452
[45] Date of Patent: Mar. 28, 2000

[54] METHOD AND DEVICE FOR PROCESSING ARBITRARY 3D SHAPED SURFACES BY MEANS OF A LASER, IN PARTICULAR FOR POLISHING AND TEXTURING WORKPIECES, AND FOR PRODUCING SEALING SURFACES ON DIES

[75] Inventor: Alexander Bestenlehrer, Herzogenaurach, Germany

[73] Assignee: Polierwerkstatt fuer Stahlformen Bestenlehrer GmbH, Herzogenaurach, Germany

[21] Appl. No.: 08/930,429
[22] PCT Filed: Apr. 9, 1996
[86] PCT No.: PCT/DE96/00621
§ 371 Date: Oct. 6, 1997
§ 102(e) Date: Oct. 6, 1997
[87] PCT Pub. No.: WO96/31315
PCT Pub. Date: Oct. 10, 1996

[30] Foreign Application Priority Data

Apr. 6, 1995 [DE] Germany .............. 295 05 958

[51] Int. Cl.[7] ........................................... B23K 26/00
[52] U.S. Cl. ................... 219/121.62; 219/121.69; 219/121.83
[58] Field of Search ............... 219/121.68, 121.69, 219/121.61, 121.62, 121.72, 121.83; 364/474.08; 700/166

[56] References Cited

U.S. PATENT DOCUMENTS

| | | | |
|---|---|---|---|
| 4,469,930 | 9/1984 | Takahashi | 219/121.72 |
| 4,752,668 | 6/1988 | Rosenfield et al. | 219/121.68 |
| 4,825,035 | 4/1989 | Moriyasu et al. | 219/121.61 |
| 4,914,270 | 4/1990 | Copley et al. | 219/121.68 |
| 4,915,757 | 4/1990 | Rando | 364/474.08 |
| 4,977,512 | 12/1990 | Nakagawa | 219/121.82 |
| 4,986,664 | 1/1991 | Lovoi | 219/121.68 |
| 5,057,184 | 10/1991 | Gupta et al. | 219/121.69 |
| 5,475,197 | 12/1995 | Wrobel et al. | 219/121.69 |
| 5,656,186 | 8/1997 | Mourou et al. | 219/121.69 |

FOREIGN PATENT DOCUMENTS

| | | |
|---|---|---|
| 26 24 121 | 12/1977 | Germany . |
| 32 26 448 | 2/1983 | Germany . |
| 37 11 470 | 10/1988 | Germany . |
| 42 19 809 | 12/1993 | Germany . |
| 43 33 501 | 4/1995 | Germany . |
| 63-101092 | 5/1988 | Japan . |

OTHER PUBLICATIONS

"Lasermesstechnik Grundlagen und Anwendungen", A. Donges, R. Noll, 1993, pp. 26–30, 214–215.

Primary Examiner—Geoffrey S. Evans
Attorney, Agent, or Firm—Oblon, Spivak, McClelland, Maier & Neustadt, P.C.

[57] ABSTRACT

A method and device for polishing and texturing workpieces by which arbitrary two-dimensional and three-dimensional shaped surfaces can be processed. The processing is performed by a laser beam. The actual surface shape and surface texture are determined before processing by a contour-measuring device. Processing parameters are calculated from the desired surface shape and the surface shape actually measured, and the processing is carried out subsequently as appropriate.

24 Claims, 7 Drawing Sheets

METHOD AND DEVICE FOR PROCESSING ARBITRARY 3D SHAPED SURFACES BY MEANS OF A LASER, IN PARTICULAR FOR POLISHING AND TEXTURING WORKPIECES, AND FOR PRODUCING SEALING SURFACES ON DIES

The present invention relates to a method and a device for processing, in particular for polishing and texturing, arbitrary 3D shaped surfaces or freeform surfaces by means of a laser, and to the use of this method for producing complementary sealing surfaces on complementary dies.

DE-A 42 41 527 discloses using laser beams, in particular pulsed excimer lasers for smoothing metal surfaces. Pulsed application with energy densities in the range of $5 \times 10^7$ Watt/cm$^2$ melts the surface of the metal melts. By using a UV or excimer laser, this happens only in the uppermost height boundary ranges of the metal down to a depth of 1 to 2 $\mu$m, the result being that no sort of deformations or cracks are produced, and the metal surface is smooth.

Methods and devices for hardening highly stressed metallic surfaces such as, for example, piston bearing surfaces are disclosed in DE-A-42 17 530, DE-A-39 22 377, EP-A-0 419 999 and U.S. Pat. No. 4,825,035.

DE-A-41 33 620 discloses texturing metallic surfaces by means of a laser beam. In this case, the laser beam traverses curved paths on the metal surface whose shape corresponds to the desired texturing.

DE-A-44 01 597 discloses a laser processing or laser cutting device, in which the cut shape to be produced can be input in the form of CAD data.

DE-A-41 06 008 discloses an automatic welding robot in which the quality of the welded seams is monitored on-line by optical monitoring of the welded seams or the welding splash.

DE-A-37 11 470 discloses a method for producing a three-dimensional model which is assembled from a multiplicity of plates which have the model contours and are produced from plate material by material-removing processing by means of a laser. In this process, material is removed at a specific site until the DESIRED value is reached.

DE-A-42 19 809 discloses a method and a device for the controlled removal of layers from a surface by means of a laser. In order to simplify the control or regulation of the removal, it is ensured that successively processed sub-surfaces always have a constant area.

The beam or laser processing methods and devices known from the prior art have the disadvantage that they can essentially be used to process only shapes known in advance. They cannot, however, be widely applied, nor is the processing of arbitrary 3D shaped surfaces possible with them.

U.S. Pat. No. 4,986,664 discloses a method and a device for controlled removal of material. In this case, the surface to be processed is measured immediately before processing, and suitable processing parameters are selected on the basis of these measured data.

JP-A-63101092 discloses a device for processing 3D shaped surfaces, in which the surface to be processed is measured immediately before processing. The measured data and the desired shape are used to calculate suitable processing parameters, which are converted into a corresponding processing of the material.

It is therefore the object of the invention to make available a method and a device for processing, in particular for polishing and texturing, workpieces by means of which arbitrary 2D or 3D shaped surfaces can be processed simply and reliably. It is also the object of the invention to provide a method and a device for producing complementary sealing surfaces and complementary dies.

Owing to the fact that the actual surface shape and texture are firstly determined by means of the 3D contour-measuring device, the laser beam can be optimized with regard to output, spacing from the workpiece, processing speed (speed with which the working beam moves over the surface to be processed), pulse duration, pulse frequency, angle between the surface and optical axis of the working beam, and number of the successive sweeps over the surfaces to be processed, in such a way as to achieve a desired roughness or smoothness. In this way, it is not only possible to smooth or to polish the surface, but processing steps which additionally remove material and change the shape or contour of the workpiece can additionally be interposed. The result of the fact that a beam-processing device generates a focused processing beam having a Rayleigh length of 300 $\mu$m and more is that, small changes in the spacing between the optical system and workpiece which occur around the focal length because of vibrations and juddering of the robot arms lead only to negligible fluctuations in the beam flux on the workpiece surface. The reliability is thereby increased.

In the method according to the invention, the ACTUAL shape of the respective sub-surface is firstly determined immediately before processing and compared with the desired shape. Because of the minimum duration between detecting the ACTUAL shape and the actual processing, faults which influence the removal of material or the polishing process become less likely. It can also be achieved in this way that such faults have the same influence on the measurement of the ACTUAL shape and the processing of the respective sub-surface, with the result that the faults average one another out.

In accordance with a second aspect of the invention, the method according to the invention is used for the simple production of arbitrarily shaped, complementary sealing surfaces on complementary dies. As a result of the high precision of the method according to the invention, the complementary sealing surfaces which come to bear against one another are very well matched and thus have a very good sealing effect.

In a first variant, only half of the pairs of complementary partial sealing surfaces are firstly processed, and the updated ACTUAL shape determined after processing is used as the DESIRED shape for the second half of the pairs of partial sealing surfaces. Faults or deviations of the first half of the pairs of partial sealing surfaces from the DESIRED shape are thereby corrected or neutralized during processing of the second half of the pairs of partial sealing surfaces.

In a second variant, processing of the complementary partial sealing surfaces is performed at a constant spacing between the complementary partial sealing surfaces. It is thereby possible to process or produce two adjacent, complementary sealing surfaces by means of only one set of DESIRED data.

If the removal of material caused by a laser beam is plotted as a function of the laser flux on the surface to be processed, the result with the other processing parameters held constant is a curve which rises flatly in the region of low laser flux, rises strongly in the region of medium laser flux, and rises more flatly again in the region of high laser flux. In accordance with the preferred embodiment of the invention, the laser is operated in the regions with a flat rise, since slight fluctuations in flux there scarcely affect the removal of material, the result being smooth, uniform surfaces.

In the case of laser polishing of workpieces, it is preferred to use the flat region of the curve associated with low laser flux, since no removal is desired with laser polishing.

Owing to the fact that the device according to the invention comprises a contour-measuring device which records the ACTUAL shape of the sub-surface to be processed immediately before processing, the processing parameters can be controlled specifically and in real time.

In accordance with a preferred embodiment, a second 3D contour-measuring device is provided which lags behind the laser beam. It is thereby possible to ascertain for the purpose of quality control whether, for example, the laser polishing has been carried out with adequate reduction of roughness or not. In addition, the measured data of this lagging contour-measuring device can also be used to optimize the strategy with regard to sweeping of the laser beam repeatedly over the surface to be polished.

The contour-measuring devices can determine the shape by optical scanning, for example triangulation, or by mechanical scanning.

The remaining subclaims relate to further advantageous embodiments so the invention.

Figure 2:
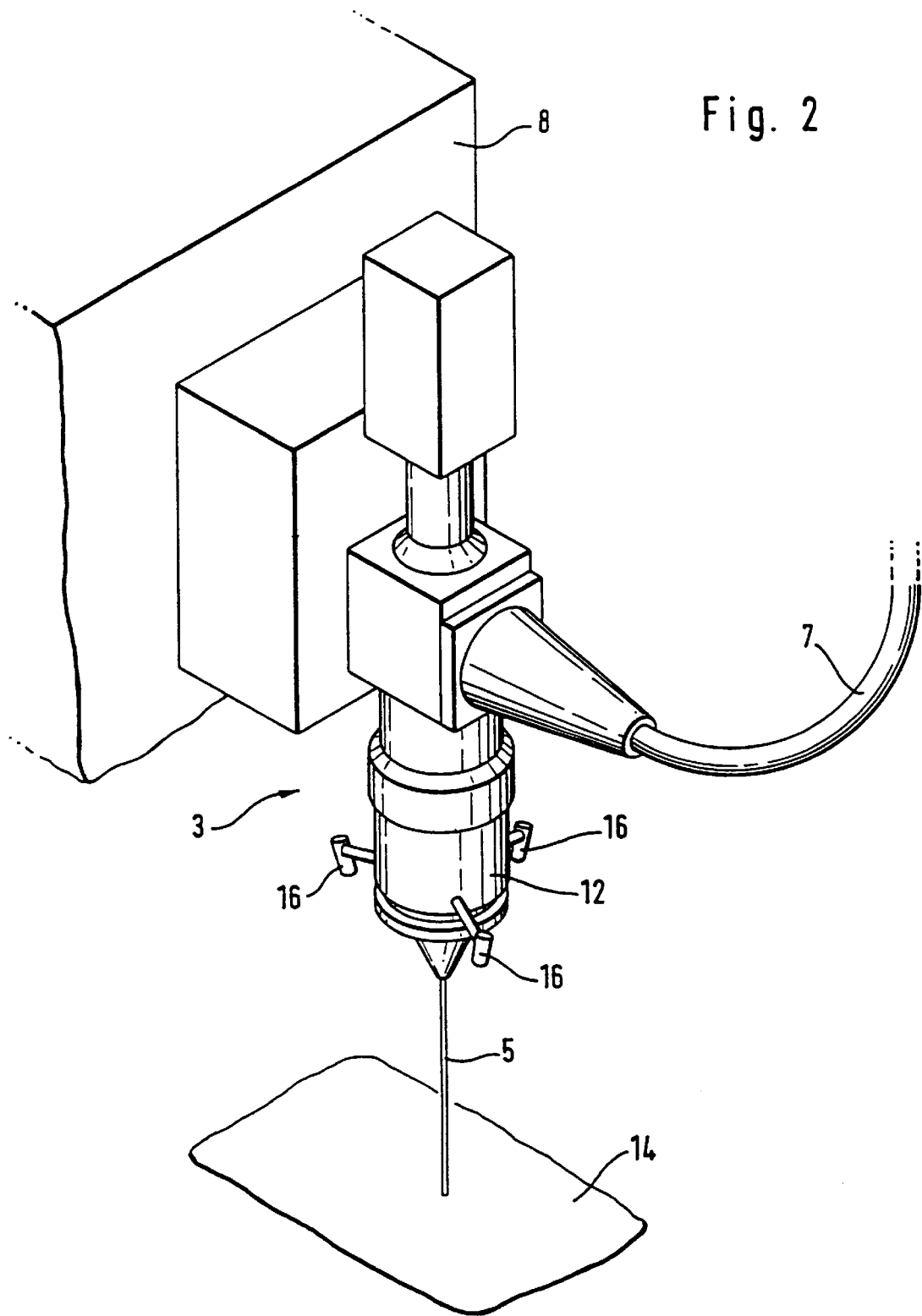
Figure 3:
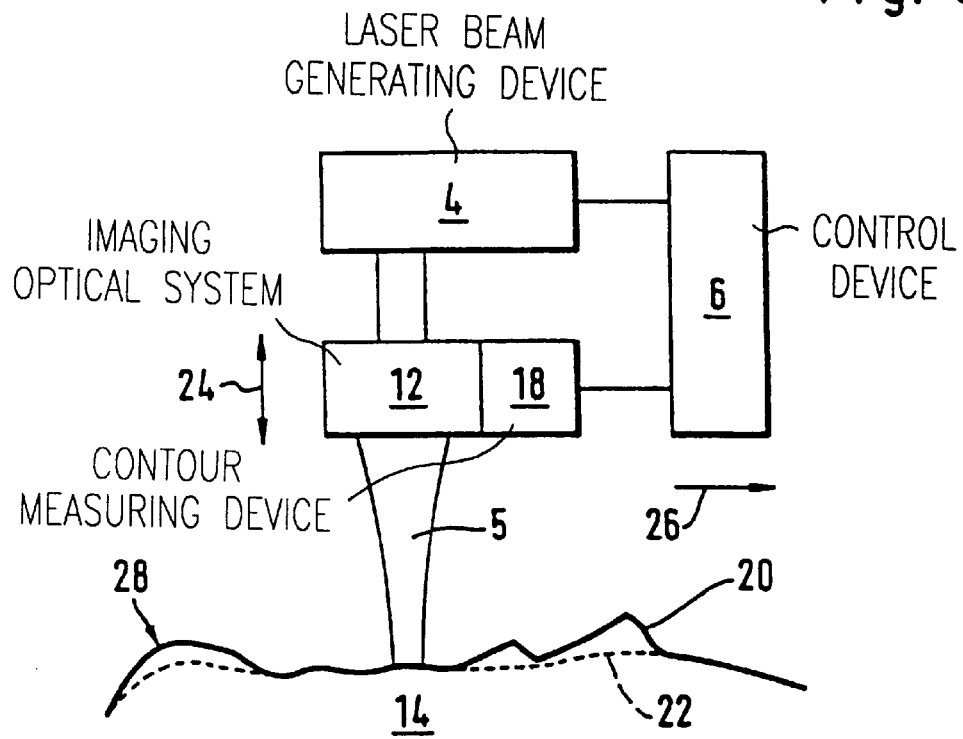
Figure 7:
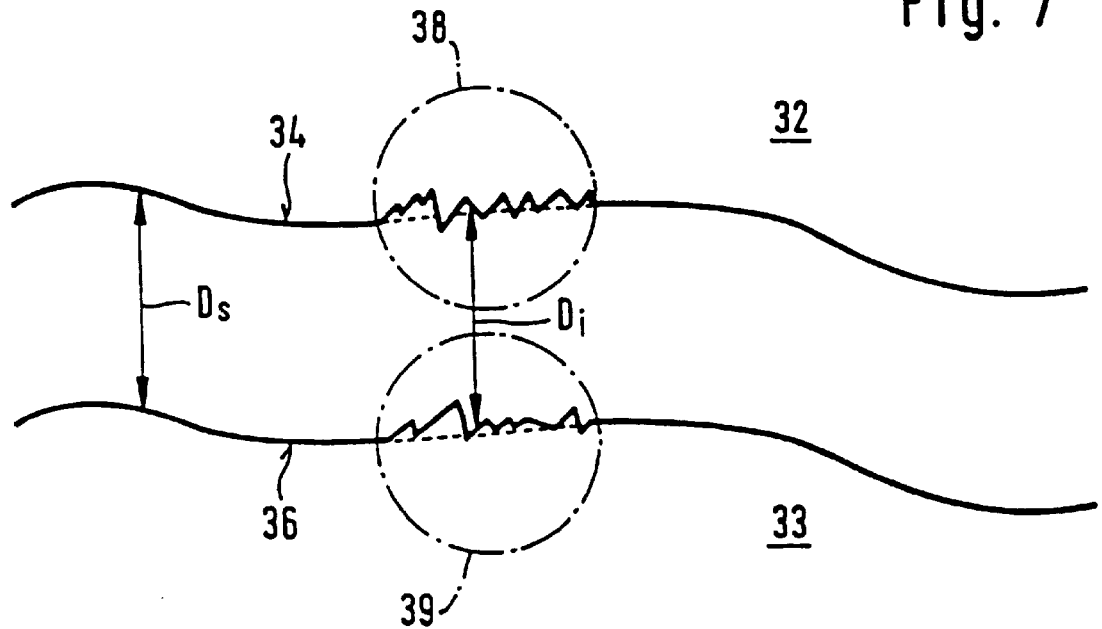
Figure 4:
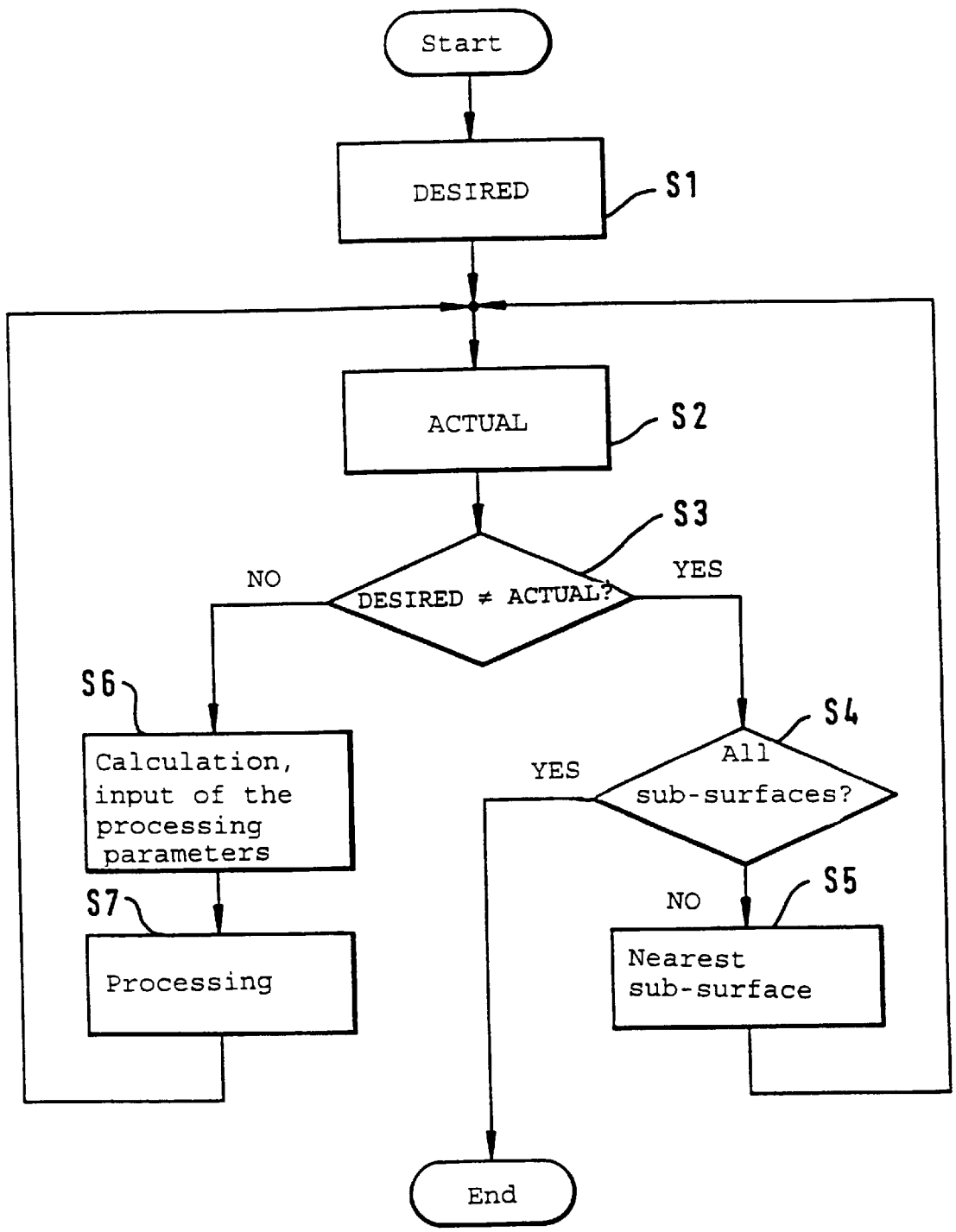
Figure 5:
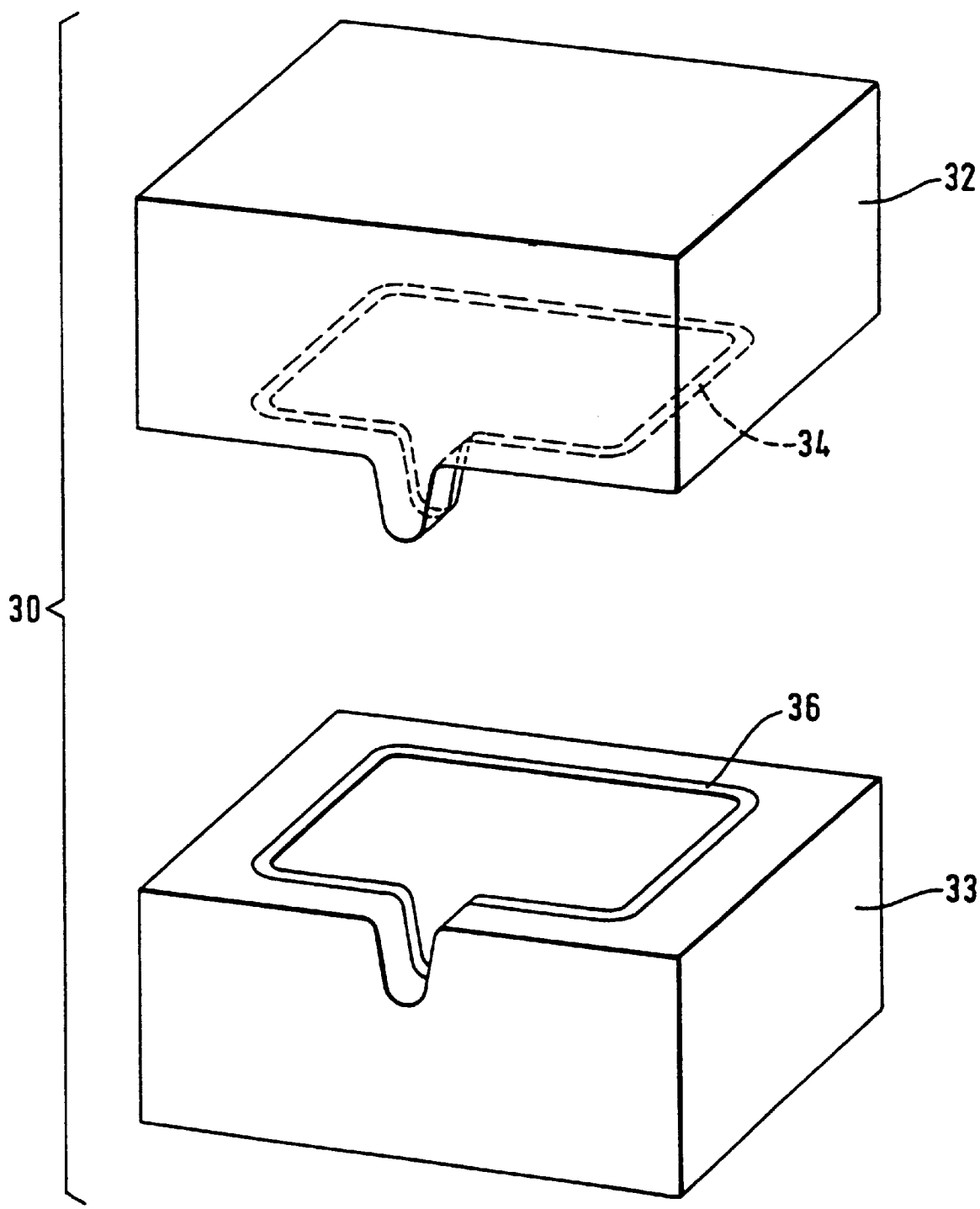
Figure 6:
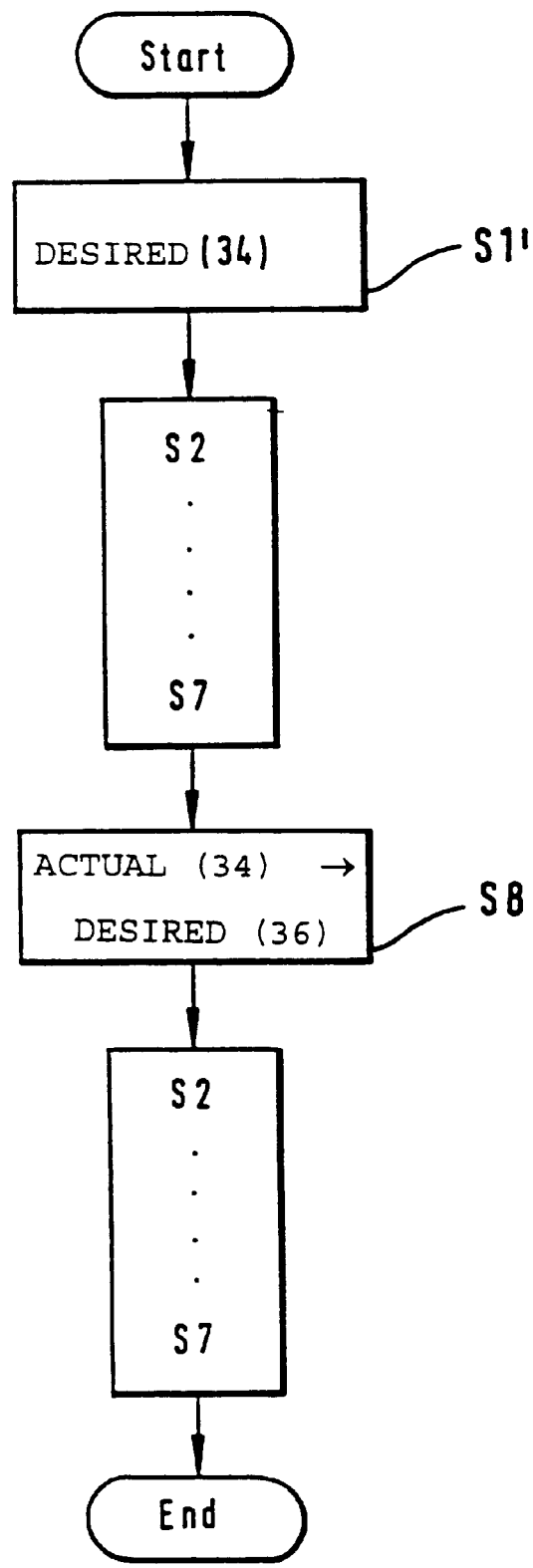
Figure 8:
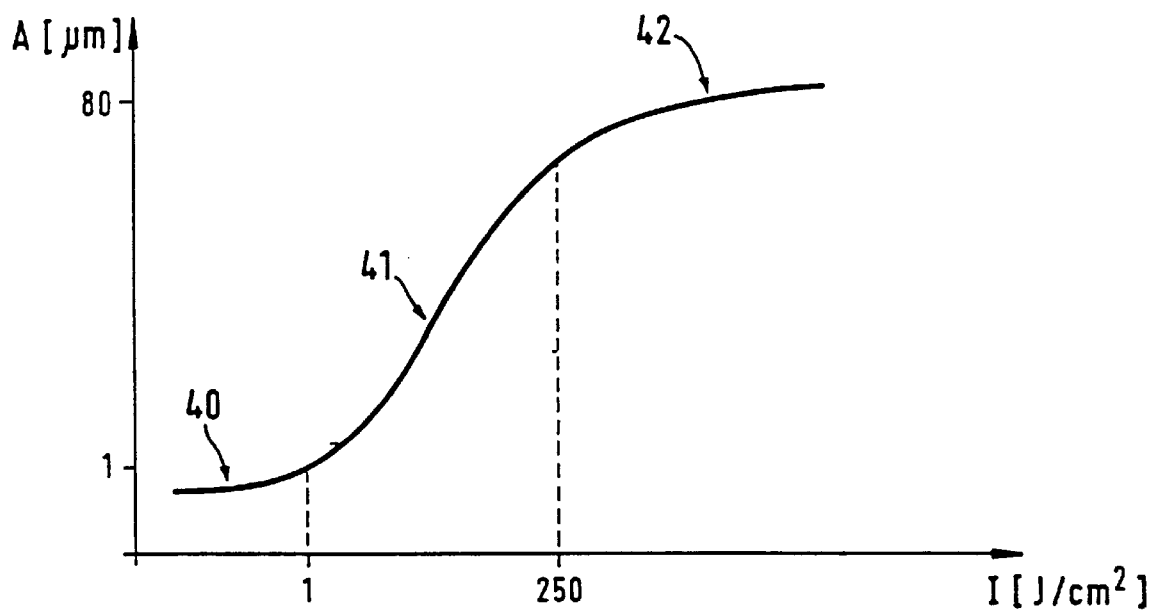
Figure 9A:
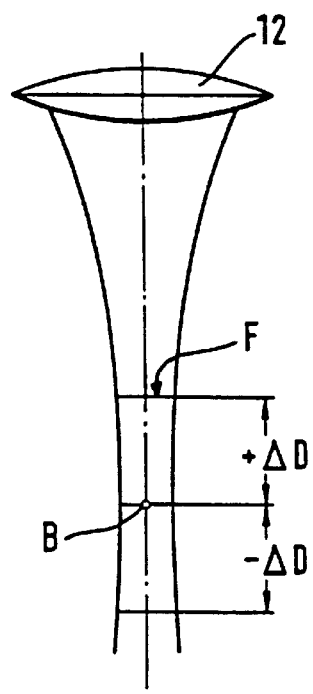
Figure 9B:
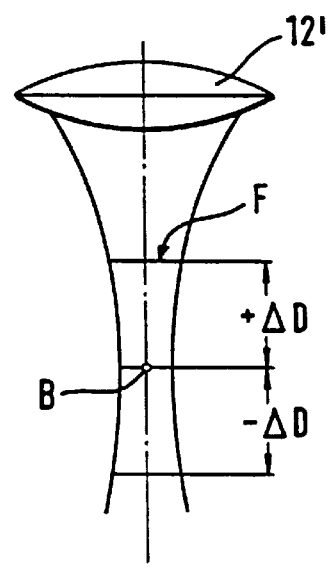

Further features, details and advantages of the invention may be gathered from the following description of an exemplary embodiment with the aid of the drawing, in which:

FIG. 1 shows a diagrammatic representation of an exemplary embodiment of the laser processing device according to the invention, FIG. 2 shows a detail of the embodiment according to FIG. 1, FIG. 3 shows a diagrammatic representation for the purpose of explaining the mode of operation of an exemplary embodiment of the invention, FIG. 4 shows a flow chart for the purpose of illustrating a preferred variant of the method according to the invention, FIG. 5 shows a diagrammatic representation of a die having two complementary parts, FIG. 6 shows a low chart for the purpose of explaining a preferred embodiment of the method for producing sealing surfaces in accordance with the present invention, FIG. 7 shows a diagrammatic representation for the purpose of explaining a further embodiment of the method for producing sealing surfaces, FIG. 8 shows a qualitative representation of the removal of material as a function of laser flux and FIGS. 9a and 9b show making optical systems having large and small Rayleigh lengths.

The exemplary embodiment shown in FIG. of the laser processing device in accordance with the present invention compress a laser device 2 composed of a laser head 3 and a laser beam generating device 4 having an associated control device 6 by means of which processing parameters such as, for example, pulse frequency, duration of pulse, degree of focusing, feed, etc. of the working or laser beam 5 can be set and controlled or regulated. The laser beam generating device 4 is connected to the laser head 3 via an optical-fibre cable 7. The laser head 3 is fastened to, a laser head holder 8, which is part of an XYZ positioning device 10. The laser head 3 also comprises an imaging optical system or focusing device 12 by means of which the laser beam 5 emerging from the laser head 3 is focused on the surface of a workpiece 14 which is to be processed. In this way, the laser head 3, and thus the laser beam 5 emerging from the laser head 3, can be moved and positioned in all three spatial directions X, Y and Z.

Also connected to the laser head 3 are measuring sensors 16 by means of which it is possible to determine the contour of the surface of the workpiece 14 to be processed, for example by triangulation, immediately before the laser beam 5 is swept over and immediately after the laser beam 5 is swept over. In this way, the result of processing by means of the laser beam 5 is checked directly during processing, and the number of times that the 3D shaped surface is swept over by the laser beam 5 can be optimized in accordance with the desired operational result.

The entire installation is controlled by the control device 6, which is used to control and regulate both the laser device 2, comprising a laser head 3 and a laser beam generating device 4, and the positioning device 10 and measuring sensors 16. Together with the measuring sensors 16, the control device 6 forms a 2D and/or 3D contour-measuring device 18. The control device 6 is, for example, a microcomputer having a mass storage device. CNC data of the workpiece 14 to be processed can, for example, be stored in this storage device. The contour-measuring device 18 can therefore be used to detect the desired/actual deviation and correspondingly to set the number of processing steps and, likewise, the laser beam characteristics.

FIG. 3 shows a diagrammatic representation of the device represented in FIG. 1 and having the laser beam generating device 4, the control device 6 and the imaging optical system 12, from which the laser beam 5 emerges and strikes the surface of the workpiece 14 to be processed, which workpiece is represented as a contour line 20 (ACTUAL shape). The DESIRED shape 22 is represented by dashes. The contour-measuring device 18 is integrated here into the imaging optical system 12, and the working beam 5 is simultaneously used as measuring beam for the contour-measuring device 18. By means of actuators (not represented in more detail), the control device 6 can be used to vary the spacing between the imaging optical system 12 and the workpiece surface 20, and this is indicated by a double arrow 24. The feed with respect to the workpiece 14 is also effected and controlled, likewise by means of the control device 6 and corresponding actuators. This is represented by an arrow 26. As may be seen from FIG. 3, the transition from the ACTUAL shape 20 to the DESIRED shape 22 is not necessarily achieved by sweeping the laser beam 5 over once. A deviation between DESIRED and ACTUAL is still to be seen in the region 28 already swept over.

In order to render the processing of material less sensitive to vibrations and juddering, the processing beam is generated with a Rayleigh length of 300 μm and higher. Details on this are explained in conjunction with FIG. 9.

FIG. 4 shows a flow chart of the method according to the invention by means of which the surface of a workpiece 14 is to be transformed from the ACTUAL shape into the DESIRED shape. Firstly, the DESIRED shape is fixed in a reference co-ordinate system in a step S1. The DESIRED shape can be provided, for example, in the form of CNC data or CAD data. The ACTUAL shape of the workpiece 14, which has not yet been processed or has been pre-processed, is then determined in a step S2 and represented in co-ordinates of the reference co-ordinate system. It is asked in a step S3 whether the ACTUAL value of the sub-surface of the workpiece 14 to be processed already corresponds to the DESIRED value or not. If this is the case, it is asked in a step S4 whether all the sub-surfaces have already been processed or not. If this is the case, processing is terminated. If not all the sub-surfaces have been processed, the transition to the nearest sub-surface is performed in a step S5, and processing begins anew in step S2.

If the interrogation in step S3 returns a NO, a branch is made to a step S6 in which the processing parameters for the laser 2 and the processing strategy are determined on the basis of comparing DESIRED and ACTUAL data, on the basis of external inputs concerning the material to be processed etc. The laser processing of the respective sub-surface is then carried out in accordance with the parameters determined in step S6 in a step S7. A branch is then made back to the step S2.

FIG. 5 is a diagrammatic representation of a die 30, which comprises two complementary parts 32 and 33. The two parts 32 and 33 can be joined, and the cavity then enclosed by them is then sealed by two complementary partial sealing surfaces 34 and 36. the partial sealing surfaces 34 and 36 can be of virtually any shape.

FIG. 6 shows a flow chart for the purpose of explaining the production of the sealing surfaces 34 and 36 by means of the method in accordance with the present invention. The DESIRED shape of only one of the two partial sealing surfaces, for example the partial sealing surface 34 is firstly fixed in a step S1'. Subsequently, processing is performed in accordance with steps S2 to S7 according to FIG. 4. If the first partial sealing surface 34 has been completely processed, the ACTUAL shape, present after processing, of the first partial sealing surface 34 is fixed in a step S8 as the DESIRED shape for the second partial sealing surface 36. The second partial sealing surface 36 is then processed in turn in a fashion analogous to the steps S2 to S7 in accordance with FIG. 4.

FIG. 7 shows a diagrammatic section through a part of the parts 32 and 33 of die 30, and a section through a part of the partial sealing surfaces 34 and 36, regions 38 and 39 being represented on an enlarged scale. The two parts 32 and 33, more precisely their partial sealing surfaces 34 and 36, are arranged at a spacing D apart from one another. Because of the roughness of the pre-processed partial sealing surfaces, 34 and 36, the actual spacing $D_i$ (ACTUAL spacing) between mutually opposite surface elements of the partial sealing surfaces 34 and 36 varies. The two die parts 32 and 33 are fixed in space at a set spacing from one another, and the ACTUAL spacing $D_i$ between mutually opposite surface elements of the partial sealing surfaces 34 and 36 is measured. The DESIRED spacing $D_s$ is then fixed, and the two partial sealing surfaces 34 and 36 are processed by means of the laser in such a way that $D_i=D_s$ within the tolerances. If this condition is fulfilled, the two partial sealing surfaces have the DESIRED shape 34' and 36'.

In FIG. 8, the removal of material A caused by the laser beam 5 is plotted in pm as a function of laser flux (power density times irradiation period) in $J/cm^2$. The result is a curve in the shape of an elongated S having a flat curve in the region of low laser flux, reference numeral 40, and in the region of high laser flux, reference numeral 42, and a steep curve in the region of medium laser flux, reference numeral 41. The values specified in FIG. 8 hold for a copper-vapour laser system such as is disclosed in DE-A 44 12 443, to the entire content of which reference is made here. For such a copper vapour laser, and with aluminium as material to be processed, the region 40 ends and the region 41 begins at approximately 1 $J/cm^2$, and the end of the region 41 and the beginning of the region 42 is at approximately 250 $J/cm^2$. Up to a laser flux of approximately 1 $J/cm^2$, the removal of aluminium is in the region of 1 μm, region 40, and in the region 42 having a laser flux above 250 $J/cm^2$, the removal of aluminium is approximately 80 μm.

According to the invention, the laser 2 is operated in the regions 40 and 42 having a flat curve, since there small fluctuations in flux such as occur, for example, owing to variations in the spacing between the laser head 3 and the surface to be processed caused by vibrations scarcely affect the magnitude of the removal of material. Consequently, controlled and precise shaping is simpler. The range 40 of low laser intensity is advantageous, in particular, in the case of laser polishing, since a large removal of material is not desired in the case of laser polishing.

The measure according to the invention by means of which the laser device 2 is rendered more insensitive to fluctuations in orientation and position, such as occur unavoidably with robot arms, is explained with the aid of FIGS. 9a and 9b. For this purpose, use is made in the laser device 2 of a focusing device or of an imaging optical system 12 which have a large Rayleigh length, preferably $\geq 300$ μm. It is known that in the case of real optical systems the focal point B is not an ideal mathematical point, but a region in space. The Rayleigh length is a measure of the variation in the cross section of the beam in the region of the geometrical focal point. The smaller the Rayleigh length, the more the real beam corresponds to the geometrical beam path.

FIG. 9a shows an optical system 12 having a large Rayleigh length, and FIG. 9b shows an optical system 12' having a small Rayleigh length. If, in both cases, the spacing between the imaging optical system 12, 12' and the surface to be processed varies about the focal point B by ΔD, the cross-sectional area F of the beam in the region between +ΔD and −ΔD, and thus the laser intensity, fluctuate substantially more strongly in the case of a small Rayleigh length—FIG. 9b—than in the case of a large Rayleigh length—FIG. 9a. A laser device 2 having an imaging optical system 12 with a large Rayleigh length is therefore less sensitive to vibrational fluctuations.

We claim:

1. Method for producing sealing surfaces on complementary dies having at least two complementary partial sealing surfaces, having the following method steps:

a) fixing the three-dimensional co-ordinates of one of the complementary partial sealing surfaces as desired data;

b) scanning at least one complementary partial sealing surface by means of a three-dimensional contour-measuring device in order to determine the precise, actual surface shape of these partial sealing surfaces in a reference coordinate system as actual data;

c) calculating processing parameters for a beam-processing device for removing material layers on the basis of the desired data determined and on the basis of the actual data determined by the three-dimensional contour-measuring device;

d) processing one of the complementary partial sealing surfaces by means of the beam-processing device on the basis of the processing parameters determined in step c);

e) re-scanning of the partial sealing surface processed in step d), by means of the three-dimensional contour-measuring device in order to determine the surface shape of the partial sealing surfaces now present after processing as updated actual data;

f) if appropriate, repeating steps b) to e) until the deviation of the desired data from the actual data is within a determined tolerance range; and g) fixing of the surface shape, last determined in step e), or of a complementary partial sealing surface which has already been processed as the desired shape for the other complementary partial sealing surfaces; and h) processing of the other complementary partial sealing surface in accordance with steps c) to f).

2. Method according to claim 1, characterized in that the beam-processing device generates a laser beam as the working beam.

3. Method according to claim 2, characterized in that the beam-processing device generates a pulsed laser beam.

4. Method according to claim 2, characterized in that the working beam of the beam-processing device is used as the measuring beam of the three-dimensional contour-measuring device.

5. Method according to claim 1, characterized in that the cross-sectional surface of the working beam hitting the partial sealing surface to be processed covers the entire width of the partial sealing surface.

6. Method according to claim 1, further comprising the step of using the actual data in place of the desired data for the first time.

7. Method according to claim 1, characterized in that the beam-processing device is operated in a range in which the changes in the removal of material due to fluctuations in beam intensity are as small as possible.

8. Method according to claim 7, characterized in that in the case of laser polishing the beam-processing device is operated in a range of low laser intensity.

9. Method according to claim 1, characterized in that the three-dimensional contour-measuring device operates by means of triangulation.

10. Method according to claim 1, characterized in that the working beam is aligned perpendicular to the surface to be processed.

11. Method for producing sealing surfaces on complementary dies having at least two complementary partial sealing surfaces, having the following method steps:
   a) arranging the complementary dies in such a way that the spacing between mutually corresponding surface sections of the partial sealing surfaces is within a first tolerance range;
   b) determining the precise spacing of mutually corresponding surface sections of partial sealing surfaces by means of a three-dimensional contour-measuring device as actual data;
   c) fixing a desired spacing which is at least as large as the largest actual spacing;
   d) calculating processing parameters for a beam-processing device for removing material layers on the basis of the desired data determined and on the basis of the actual data determined by the three-dimensional contour-measuring device;
   e) processing at least one of the complementary partial sealing surfaces by means of the beam-processing device on the basis of the processing parameters determined in step d);
   f) re-determining of the precise spacing of mutually corresponding surface sections of partial sealing surfaces by means of the three-dimensional contour-measuring device as updated actual data;
   g) if appropriate, repeating steps d) to f) until the deviation of the desired data from the actual data is within a second tolerance range which is smaller than the first tolerance range.

12. Method according to claim 11, further comprising the step of using the actual data in place of the desired data for the first time.

13. Method according to claim 11, characterized in that the beam-processing device is operated in a range in which the changes in the removal of material due to fluctuations in beam intensity are as small as possible.

14. Method according to claim 13, characterized in that in the case of laser polishing the beam-processing device is operated in a range of low laser intensity.

15. Method according to claim 11, characterized in that the three-dimensional contour-measuring device operates by means of triangulation.

16. Method according to claim 11, characterized in that the beam-processing device generates a laser beam as the working beam.

17. Method according to claim 16, characterized in that the beam-processing device generates a pulsed laser beam.

18. Method according to claim 16, characterized in that the working beam of the beam-processing device is used as the measuring beam of the three-dimensional contour-measuring device.

19. Method according to claim 11, characterized in that the working beam is aligned perpendicular to the surface to be processed.

20. Device for polishing and texturing, arbitrary three-dimensional shaped surfaces by means of a laser beam, having:
   a laser device for generating a laser beam having specific characteristics;
   a device for guiding and directing the laser beam in such a way that sub-surfaces of the surface to be processed are swept over sequentially in time by the laser beam;
   a first three-dimensional contour-measuring device for scanning and recording the three-dimensional profile of the three-dimensional shaped surface to be processed by scanning the sub-surface regions, swept over by the laser beam, directly ahead of the laser beam sweeping over the sub-surface to be processed; and
   a control device for controlling the three-dimensional contour-measuring device and for controlling and regulating the laser device and the device for guiding and directing the laser beam as a function of the three-dimensional profile detected by the three-dimensional contour-measuring device, characterized in that the laser device is a Cu-vapour laser ablation device and comprises a focusing device which generates a focused processing beam having a Raleigh length of greater than or equal to 300 $\mu$m.

21. Device according to claim 20, characterized in that the control device comprises a storage device in which the desired three-dimensional profile of the shaped surface to be processed is stored in the form of CNC data.

22. Device according to claim 20, characterized in that a second three-dimensional contour-measuring device for scanning and recording the three-dimensional profile of the three-dimensional freeform surface to be processed by scanning the sub-surface regions swept over by the laser beam directly behind the laser beam sweeping over the sub-surface to be processed.

23. Device according to claim 22, characterized in that the measurement results of the second three-dimensional contour-measuring device are fed to the control device for controlling and regulating the laser device and to the device for guiding and directing the laser beam.

24. Device according to claim 20, characterized in that the laser device generates a pulsed laser beam.

* * * * *

UNITED STATES PATENT AND TRADEMARK OFFICE
CERTIFICATE OF CORRECTION

PATENT NO. : 6,043,452
DATED      : March 28, 2000
INVENTOR(S): Alexander BESTENLEHRER It is certified that an error appears in the above-identified patent and that said Letters Patent is hereby corrected as shown below:

On the title page, item [30] is incorrectly listed. The Foreign Application Priority Data should be:

--[30] Foreign Application Priority Data

Apr. 6, 1995 [DE] Germany........295 05 985--

Signed and Sealed this

Tenth Day of April, 2001

Attest:

NICHOLAS P. GODICI

*Attesting Officer*     *Acting Director of the United States Patent and Trademark Office*